(12) United States Patent
Kondo et al.

(10) Patent No.: US 7,369,733 B2
(45) Date of Patent: May 6, 2008

(54) GLASS OPTICAL WAVEGUIDE

(75) Inventors: Yuki Kondo, Yokohama (JP); Motoshi Ono, Yokohama (JP); Naoki Sugimoto, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 11/622,829

(22) Filed: Jan. 12, 2007

(65) Prior Publication Data

US 2007/0165993 A1 Jul. 19, 2007

Related U.S. Application Data

(63) Continuation of application No. PCT/JP2005/013084, filed on Jul. 14, 2005.

(30) Foreign Application Priority Data

Jul. 15, 2004 (JP) ............................. 2004-208658
Mar. 7, 2005 (JP) ............................. 2004-062532

(51) Int. Cl.
*G02B 6/26* (2006.01)
*G02B 6/42* (2006.01)
*G02B 6/02* (2006.01)
*G02B 6/028* (2006.01)
*G02B 6/32* (2006.01)
*G02B 6/036* (2006.01)
*G02B 6/10* (2006.01)

(52) U.S. Cl. .......................... 385/129; 385/15; 385/39; 385/123; 385/124; 385/125; 385/126; 385/127; 385/128; 385/130; 385/131; 385/132

(58) Field of Classification Search ................. 385/15, 385/39, 123–132
See application file for complete search history.

(56) References Cited

U.S. PATENT DOCUMENTS 6,950,588 B2 9/2005 Terakawa et al.

(Continued)

FOREIGN PATENT DOCUMENTS

CN 1234028 C 12/2005

(Continued)

OTHER PUBLICATIONS

Besley et al, Optical and Quantum Electronics, 2002, vol. 34, No. 4, pp. 317-330.

*Primary Examiner*—Brian Healy
*Assistant Examiner*—Jerry Martin Blevins
(74) *Attorney, Agent, or Firm*—Oblon, Spivak, McClelland, Maier & Neustadt, P.C.

(57) ABSTRACT

In a glass optical waveguide having a core containing at least one oxide selected from the group of glass-constituting oxides consisting of $Bi_2O_3$, $Sb_2O_3$, PbO, $SnO_2$ and $TeO_2$, large transmission loss of light which occurs when the cross-sectional shape of the core is rectangle, is reduced, and wherein the glass optical waveguide contains at least total 35% in mass % of at least one type of the above glass-constituting oxides, wherein the cross-sectional shape of the core is trapezoidal, among two parallel sides of the trapezoid, a long side is in a substrate side and among four sides constituting the trapezoid, angles of two oblique sides to the long side are each within a range of from 60 to 80°.

13 Claims, 3 Drawing Sheets

U.S. PATENT DOCUMENTS

2003/0039459 A1* 2/2003 Brambilla et al. .......... 385/132

FOREIGN PATENT DOCUMENTS

| | | |
|---|---|---|
| EP | 1 336 894 A2 | 8/2003 |
| JP | 4-213884 | 8/1992 |
| JP | 5-327125 | 12/1993 |
| JP | 8-242030 | 9/1996 |
| JP | 9-325228 | 12/1997 |
| JP | 2001-102661 | 4/2001 |
| JP | 2001-305358 | 10/2001 |
| JP | 2003-4958 | 1/2003 |
| JP | 2003-227947 | 8/2003 |
| JP | 2003-240991 | 8/2003 |
| JP | 2003240991 A * | 8/2003 .................. 385/14 |
| JP | 2003-262751 | 9/2003 |
| JP | 2003262751 A * | 9/2003 .................. 385/14 |
| JP | 2004-55717 | 2/2004 |

* cited by examiner

GLASS OPTICAL WAVEGUIDE

TECHNICAL FIELD

The present invention relates to a glass optical waveguide.

BACKGROUND ART

In order to develop an optical amplifier to be used for the optical communication field of wavelength division multiplex system (WDM), a glass fiber having a core containing a rare earth element has been eagerly researched and developed. However, in an optical fiber having a core made of an Er-doped silica glass type glass, there are such problems as difficulty in obtaining desired transmission band, difficulty in achieving downsizing and difficulty in constituting an array. As a measure against these problems, an optical fiber having a core made of an Er-containing $Bi_2O_3$ type glass material (refer to e.g. Patent Document 1) or an optical waveguide having an optical amplifying core made of a glass material formed on a substrate, has been proposed and developed.

As a glass waveguide, a silica glass type glass waveguide is commonly known. As a method for forming a fine waveguide pattern on e.g. a silica glass film, dry etching technique is used and patterning is usually carried out using a resist or a metal film as a mask. Namely, a silica glass film to be subjected to microfabrication is coated with a resist, and the resist is subjected to pattern exposure and unnecessary-resist-removal process by development, to form a resist pattern, and the resist pattern is used as a mask for dry etching. As an alternative method, a metal film is formed on the silica glass film, the above-mentioned resist patterning is carried out, the metal film is dry etched using the resist as a mask, and the dry-etched metal film is used as a mask for etching the silica glass film.

FIG. 3 is a schematic cross-sectional view showing the method for producing a conventional optical waveguide, and explanation is made using FIG. 3. In this method, a silica glass film is dry etched using a metal film as a mask. On a substrate made of silica glass or Si, first of all, an underlayer clad film 12 is formed, and subsequently, on the underlayer clad film 12, a core film 13 made of silica glass is formed to have a thickness of from 5 to 10 μm (FIG. 3(a)). Thereafter, a metal film 14 is formed on the core film 13 (FIG. 3(b)), the metal film 14 is uniformly coated with a resist 15, the resist 15 is subjected to core circuit pattern exposure using a mask aligner, the resist is developed to form a resist pattern by transferring the circuit pattern (FIG. 3 (c)). Using the resist pattern as a mask, the metal film 14 is dry etched by a reactive ion etching method as shown in FIG. 3(d) to form a metal mask pattern, and the resist is removed (FIG. 3 (e)). Subsequently, using the metal mask pattern as a mask, the core film 13 is etched (FIG. 3(f)), the metal mask pattern is removed (FIG. 3(g)), an upper layer clad film 16 is applied so as to cover the core, to complete an optical waveguide (FIG. 3(h)).

FIG. 2 is an enlarged view in the vicinity of a core in a silica glass waveguide of FIG. 3, which is a schematic diagram of cross-section of an optical waveguide. A reference numeral 21 indicates a core, 22 indicates a clad, 22a indicates an underlayer clad film, 22b indicates an upper layer clad film and 23 indicates a substrate. The cross-sectional shape of a core is usually a rectangle, preferably a square. The reason is as follows. The causes of optical attenuation in a waveguide are coupling loss at a light input/output end and transmission loss in the waveguide itself. Loss of the waveguide itself is caused by loss of a film itself, surface roughness of side walls of a core after etching, structural design of the waveguide or the like, and does not relate to cross-sectional shape of the core. On the other hand, loss at a coupling portion closely relates to the cross-sectional shape of the core. When propagation mode of light in an input/output device such as an input fiber (hereinafter "propagation mode of light" is simply referred to as "mode") significantly overlaps a mode of waveguide, loss is reduced, but when they scarcely overlap, loss is increased. Since the mode in an input/output device is usually a circular shape, the waveguide is designed to have a mode of circular shape. When the shape of the waveguide is square, the mode becomes a circular shape and the coupling loss is reduced.

For these reasons, core shape of commonly-used glass waveguide is mostly rectangle.

On the other hand, in an array waveguide grating optical coupler/splitter (AWG) employing a silica glass waveguide, study has been made to form a part of a waveguide into trapezoid instead of rectangle (refer to Patent Document 2). Optical loss in an AWG is a sum of coupling loss of input/output device and AWG device, loss is of AWG itself, and radiation loss in a connecting portion of slab waveguide and array waveguide constituting AWG.

The loss in the connecting portion of slab waveguide portion and array waveguide portion occupies most of the loss in an AWG.

When light is incident from a slab waveguide portion into an array waveguide portion, since effective refractive index drastically changes at the connecting portion, a part of propagation light leaks out into a clad. This causes to increase radiation loss. In order to ease drastic change of effective refractive index, it is considered to be preferable to make a core shape in the vicinity of the connecting portion with the array waveguide into a trapezoid.

Patent Document 1: JP-A-2001-102661
Patent Document 2: JP-A-2003-4958

DISCLOSURE OF THE INVENTION

Problems to be Solved by the Invention

However, it has discovered that when a glass film containing total at least 35% in mass percentage of at least one type of oxide selected from the group consisting of $Bi_2O_3$, $Sb_2O_3$, PbO, $SnO_2$ and $TeO_2$, such as a Er-doped $Bi_2O_3$ type glass (hereinafter referred to as $Bi_2O_3$ etc.—containing glass film) to be used for optical amplifying core of an optical waveguide, is dry etched to form a core shape into a rectangle, a new problem arises that side walls of the pattern does not become smooth. This is because, though reaction product produced by dry etching a silica glass type glass is highly volatile and quickly exhausted out of the etching system, in a case of $Bi_2O_3$ etc.—containing glass film, a product produced by a reaction of content of the glass film with an etching gas at the time of dry etching is little volatile, and accordingly, when the core shape is rectangle, the reaction product adheres to side walls of the core and the side walls at angles close to vertical are hardly etched, which is considered to cause surface roughness. If smooth core side walls can not be obtained, when the waveguide is completed, signal light is scattered at a boundary of the core and the clad, which causes a fatal problem of increasing propagation loss, which prevents practical use.

Means for Solving the Problems

The present invention has been made to solve the above-mentioned problems, and the present invention provides a glass optical waveguide comprising a core and a clad made of a glass formed on a planar substrate, wherein the glass constituting the core contains total at least 35% in mass % of at least one type of oxide selected from the group consisting of $Bi_2O_3$, $Sb_2O_3$, PbO, $SnO_2$ and $TeO_2$ as glass-constituting oxide, cross sectional shape of the core is a trapezoid having a long side in the substrate side, and among four sides constituting the trapezoid, angles of two oblique sides to the long side are each within a range of from 60 to 80°.

According to this construction, the present invention solves a problem that walls of the pattern does not become smooth, when the above-mentioned $Bi_2O_3$ etc.—containing glass film, namely, a glass film containing total at least 35% in mass % of at least one type of oxide selected from the group consisting of $Bi_2O_3$, $Sb_2O_3$, PbO, $SnO_2$ and $TeO_2$, is dry etched. Accordingly it is possible to reduce propagation loss of signal light due to its scattering at the boundary between a core and a clad when a waveguide is formed.

Further, the present invention provides the glass optical waveguide wherein the glass-constituting oxide of the clad is at least one type of oxide selected from the group consisting of $Bi_2O_3$, $Sb_2O_3$, PbO, $SnO_2$ and $TeO_2$, and a value obtained by dividing the refractive index difference between the core and the clad by the refractive index of the core is within a range of from 0.0003 to 0.1.

According to this construction, it is possible to constitute an optical waveguide of low loss capable of single mode propagation in a communication wavelength band around 1.55 μm. If the value obtained by division process is smaller than 0.0003, refractive index difference between the core and the clad becomes too small and it may be difficult to sufficiently enclose light in the core. On the other hand, if the value obtained by the division process exceeds 0.1, the number of modes capable of propagating in the waveguide may not be single but plural, and thus, a multi-mode waveguide may be formed.

Further, the present invention provides the glass optical waveguide wherein the core of the optical waveguide is formed by dry etching.

According to this construction, when the core of the glass optical waveguide is made of at least one type of oxide selected from the group consisting of $Bi_2O_3$, $Sb_2O_3$, PbO, $SnO_2$ and $TeO_2$, by forming the core by dry etching method, it is possible to remove attachment in the vicinity of the side walls of the core to make the side walls smooth.

Further, the present invention provides the glass optical waveguide, wherein the glass-constituting oxide of the core is a glass-constituting oxide containing total at least 35% of $Bi_2O_3$ in mass %.

According to this construction, when the waveguide is used as e.g. nonlinear optical waveguide, it is possible to increase its nonlinearity.

Further, the present invention provides the glass optical waveguide, wherein the glass-constituting oxide of the core contains at least one of Er and Tm.

According to this construction, it is possible to provide an optical amplifying waveguide containing at least one of Er and Tm.

In this case, it is preferred that the glass-constituting oxide of the core is a composition consisting essentially of 35 to 90% of $Bi_2O_3$, 2 to 40% of $SiO_2$, 5 to 25% of $Ga_2O_3$, 0 to 5% of $Al_2O_3$, 0.1 to 10% of at least one of $Er_2O_3$ and $Tm_2O_3$ and 0 to 10% of $Yb_2O_3$.

According to this construction, it is possible to provide an optical amplifying waveguide of 0.4 to 2 μm wavelength band.

Further, the present invention provides a glass optical waveguide, wherein the glass-constituting oxide of the core contains at least one type selected from the group consisting of Er, Tm, Yb and Ho.

Since these elements show laser activation, this construction enables to provide an optical amplifying waveguide usable as a laser medium in a wavelength band corresponding to laser active ion contained in the core.

Further, the present invention provides an optical amplifying waveguide for optical communication and an optical waveguide type laser medium comprising the above-mentioned glass optical waveguide.

EFFECTS OF THE INVENTION

According to the optical waveguide of the present invention, it is possible to obtain an optical waveguide having a core made of a glass material containing total at least 35% in mass % of at least one type of oxide selected from the group consisting of $Bi_2O_3$, $Sb_2O_3$, PbO, $SnO_2$ and $TeO_2$, and showing low propagation loss.

The glass optical waveguide of the present invention is suitable for an optical amplifying waveguide, nonlinear optical waveguide or the like in 0.4 to 2 μm wavelength band, and the glass optical waveguide can amplify light of 1.45 to 1.64 μm wavelength band such as signal light of C band (1,530 to 1,565 nm). Further, according to the present invention, a compact optical light guide can be obtained.

EXPLANATION OF NUMERALS

Figure 1:
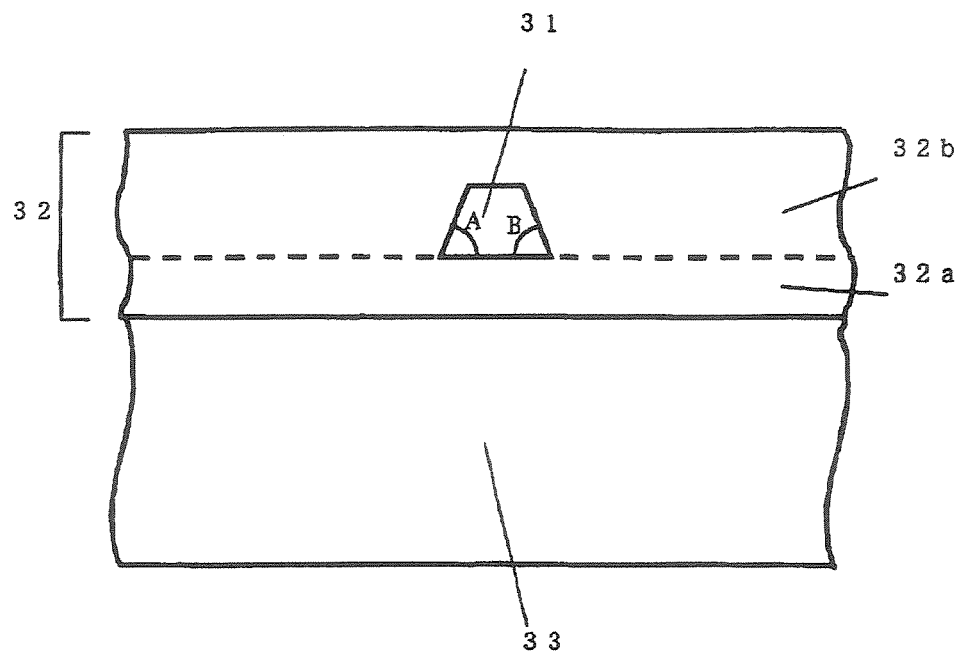
FIG. 1: An enlarged cross-sectional view in the vicinity of a core of an optical waveguide of the present invention.
Figure 2:
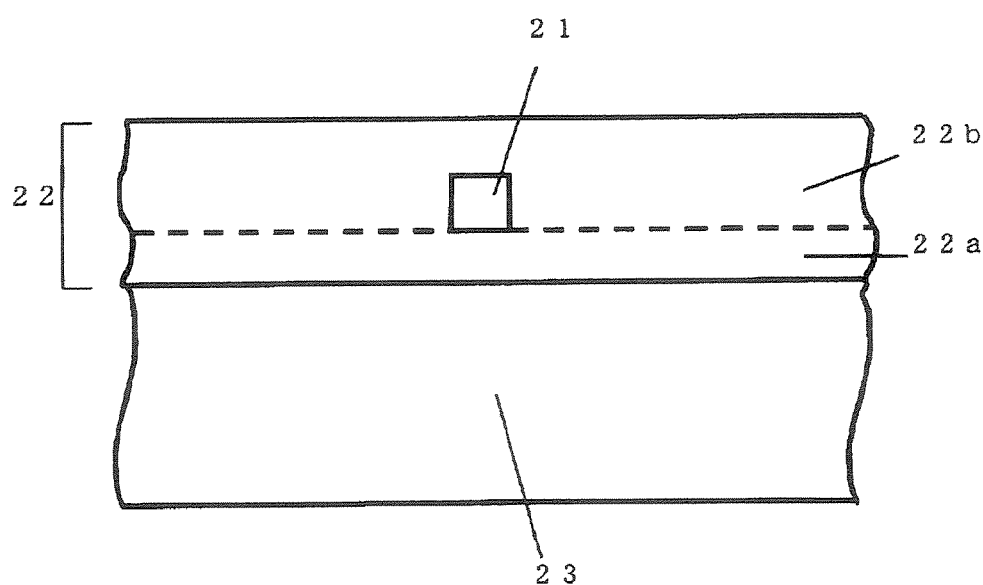
FIG. 2: An enlarged cross-sectional view in the vicinity of a core of a commonly-used optical waveguide.
Figure 3:
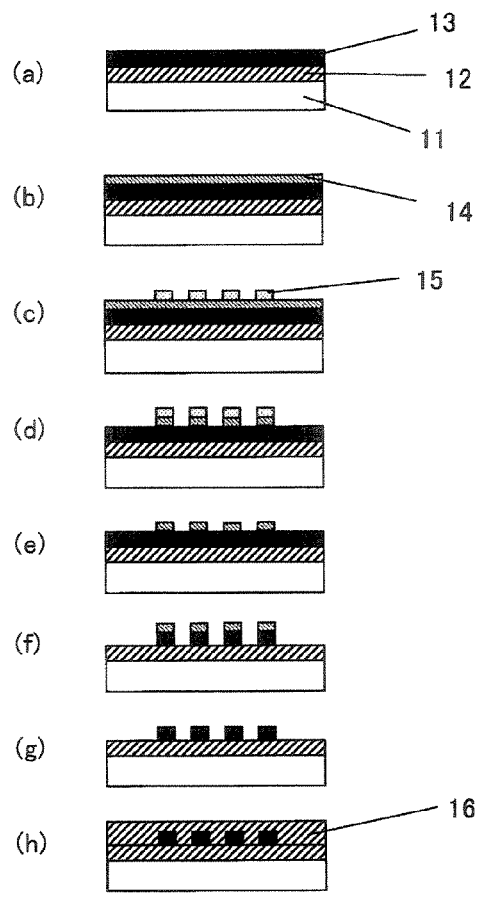
FIG. 3: A view showing a process for producing a commonly used optical waveguide.

11: substrate
12: 22a, 32a: underlayer clad film
13: core film
14: metal film
15: resist
16: 22b, 32b: upper layer clad film
21: core
22: clad
23: substrate
31: core
32: clad
33: substrate
34: mirror formed on exciting light input end 35: mirror formed on laser light output end
36: exciting light
37: laser light

BEST MODE FOR CARRYING OUT THE
INVENTION

<Process for Producing Substrate and Glass Film>

The glass to be subjected to microfabrication in the present invention may be a glass film formed on a substrate by various methods or may be a glass substrate itself.

The substrate preferably has a Young's modulus of at least 50 GPa for the following reasons. Namely, if the Young's modulus of the substrate is lower than 50 GPa, is when a stress is formed in the film formed on the substrate, bowing or deformation of the substrate is generated by the stress, and the shape of the waveguide may deviate from the designed shape. As such a material having a Young's modulus of at least 50 GPa, a crystal of a material such as Si, GaAs, $Al_2O_3$, MgO or sapphire, or a glass such as a silica glass, a soda lime silica glass, a non-alkali glass or a plasma display-use glass, may be mentioned.

The material of the substrate is not limited to one made of the above-mentioned materials, but in a case where a high-temperature treatment step is included in the process, such a case where high temperature is required in a step of annealing a core glass film or in a step of forming another element on the same substrate, the material is required to be durable against this high-temperature treatment step.

Further, the shape of the substrate is not limited in the present invention, but the surface on which the glass thin film is formed is usually a plane. Further, usually, the size and the shape of the substrate is a rectangular substrate of from 2 mm×10 mm to 200 mm×200 mm, or a circular substrate having a diameter of from 50 to 205 mm, and the thickness is 0.3 to 2 mm. The thickness of the glass film is usually from 3 to 70 μm, but not limited thereto.

Forming of the glass film on the substrate is carried out, for example, by physical vapor deposition method (PVD) or chemical vapor deposition method (CVD).

As the physical vapor deposition method, a sputtering method, a laser ablation method, an electron beam vapor deposition method, or a vacuum vapor deposition method is mentioned, and as the chemical vapor deposition method, a plasma CVD method or a MOCVD method is mentioned.

In a case of forming a glass film having 4 or at least 5 constituents, it is preferred to employ a sputtering method for the following reasons.

If a film having many constituents is formed by using a plasma CVD, MOCVD or vapor deposition method, thermal characteristics of raw materials tend to be different or thermal characteristics of constituent elements tend to be different, and thus, mixing of raw materials in a reaction chamber or composition adjustment of the film becomes difficult. On the other hand, in a sputtering method, even in a case of many constituents, composition adjustment is easily carried out by preparing targets for respective constituents and adjusting applied RF power for the respective constituents. Further, film forming is also possible by preparing a target having the same composition as the film material. However, in this case, there is a case where the composition of the film is not consistent with the composition of the target, and in such a case, it is preferred to use a target whose composition is adjusted so as to obtain a desired film composition.

The target is produced, for example, by preparing powders of the constituent oxides at a desired composition ratio, dry-mixing by a mortar, melted in an electric furnace heated to 1,150° C., and thereafter, the material is flown out on a stainless steel plate, cut into a desired thickness and external size, and bonded to a backing plate by e.g. indium. Further, the target may be produced by sintering a mixture of the oxide powders without melting it in an electric furnace, or by sintering a pulverized glass of a glass melted in an electric furnace.

<Composition of Glass Film>

The glass-constituting oxide of a glass film to be subjected to microfabrication in the present invention, namely, the glass-constituting oxide of a core, has a composition containing at least 35% in mass % of at least one type of oxide selected from the group consisting of $Bi_2O_3$, $Sb_2O_3$, PbO, $SnO_2$ and $TeO_2$, more preferably $Bi_2O_3$. In the following, simple % means mass %. More preferably, the composition contains 35 to 90% of $Bi_2O_3$, 2 to 40% of $SiO_2$, 0 to 55% of $Ga_2O_3$, 0 to 50% of $Al_2O_3$, 0 to 10% of $Er_2O_3$, 0 to 10% of $Tm_2O_3$ and 0 to 10% of $Yb_2O_3$. Further, the composition may contain other constituents as a total within a range of at most 25%, preferably at most 15%.

$Bi_2O_3$, $Sb_2O_3$, PbO, $SnO_2$ and $TeO_2$ are constituents to increase refractive index, and the composition has to is contain at least one type of these five constituents.

When the sum of the content of $Bi_2O_3$, the content of $Sb_2O_3$, the content of PbO, the content of $SnO_2$ and the content of $TeO_2$, is less than 35%, light amplifying rate or nonlinearity decreases. Further, the total is preferably at most 90%, and if it exceeds 90%, it may be difficult to make the material in the state of glass.

In a case where the waveguide of the present invention is applied to e.g. an optical amplifying waveguide or a nonlinear optical waveguide, the core preferably contains 35 to 90% of $Bi_2O_3$ as a glass-constituting oxide. If the amount of $Bi_2O_3$ is less than 35%, light amplifying rate or nonlinearity decreases. The amount is more preferably at least 40%, particularly preferably at least 60%. If the amount of $Bi_2O_3$ exceeds 90%, it becomes difficult to form a glass, and thus, the amount is more preferably at most 85%.

$SiO_2$ is not essential, but the core preferably contains $SiO_2$ to increase stability of glass, and the content is preferably from 2 to 40%. If the content is less than 2%, stabilizing effect of glass is small, and the content is more preferably at least 3%. If the amount of $SiO_2$ exceeds 40%, refractive index decreases and optical amplifying rate or nonlinearity may decrease.

$Ga_2O_3$ is not essential, but the core preferably contains this constituent for improving anti-devitrification property of glass, such being preferred. Particularly, in order to increase thermal stability, $Ga_2O_3$ may be contained up to 55%, but when the content exceeds 55%, the material tends to be crystallized. Further, if the amount of $Ga_2O_3$ exceeds 25%, smoothness of side walls decreases at a time of producing the waveguide by dry etching, which may increase loss of the waveguide, whereby the content is at most 25%. Further, in a case where the glass optical waveguide of the present invention is used as an optical amplifying waveguide, if at least 5% of $Ga_2O_3$ amount is contained, a gain is obtained in wider wavelength band, such being preferred.

$Al_2O_3$ is not essential, but it may be contained up to 50% to increase thermal stability. If the amount of $Al_2O_3$ exceeds 50%, the material tends to be crystallized. In order to improve smoothness of side walls of a waveguide when it is produced by dry etching, the amount of $Al_2O_3$ is preferably at most 5%. By this construction, it is possible to significantly reduce loss of waveguide.

$Er_2O_3$ and $Tm_2O_3$ are not essential as mere glass constituents, but in order to perform optical amplification, at least one or both of them need to be contained in an amount of at least 0.01%. In a case where either one of $Er_2O_3$ and $Tm_2O_3$ is contained alone, the amount, and in a case where both of them are contained, sum of their contents, is preferably from 0.01 to 10% since it becomes difficult to form a glass if is these amounts exceed 10%. Further, if the above-mentioned content exceeds 5%, concentration quenching occurs and light amplification rate tends to decrease, whereby the content is preferably from 0.01 to 5%, more preferably from 0.1 to 2%. The glass-constituting oxide of a core preferably contains either one of Er or Tm.

Particularly in a case of constituting a light-amplifier, it is preferred to contain either one of Er or Tm.

$Yb_2O_3$ is not essential, but in order to decrease concentration quenching or in order to increase light amplifying rate by using $Yb_2O_3$ in combination with $Er_2O_3$ or $Tm_2O_3$, $Yb_2O_3$ may be contained in an amount of up to 10%.

If the content exceeds 10%, it becomes difficult to form a glass, the amount of $Yb_2O_3$ is preferably from 0.1 to 5%.

The composition of a core glass film of an optical amplifying waveguide typically consists essentially of 35 to 90% of $Bi_2O_3$, 2 to 40% of $SiO_2$, 5 to 25% of $Ga_2O_3$, 0 to 5% of $Al_2O_3$, total 0.01 to 10% of $Er_2O_3$ and $Tm_2O_3$, and 0 to 10% of $Yb_2O_3$. More preferably, the composition consists essentially of 40 to 85% of $Bi_2O_3$, 2 to 40% of $SiO_2$, 5 to 25% of $Ga_2O_3$, 0 to 5% of $Al_2O_3$, total 0.01 to 10% of $Er_2O_3$ and $Tm_2O_3$, 0 to 10% of $Yb_2O_3$. Further, the composition may contain total at most 25%, preferably at most 15%, of other constituents.

When the core glass film of the optical amplifying waveguide contains more than 0.5% of $La_2O_3$ in addition to the above-mentioned composition, dispersion of Er ion or Tm ion being light-amplifying activator improves, such being preferred. Further, when the amount of $La_2O_3$ exceeds 5%, devitrification tends to occur, and thus, the amount is preferably at most 5%.

No crystal separates out on a glass or a glass film of the present invention. Namely, no diffraction peak is recognized in an X-ray diffraction pattern.

<Patterning of Glass Film or Glass>

Explanation is made on the assumption that the glass film is patterned by dry etching. As a mask for patterning, a film made of an alloy of W and Si formed on the above-mentioned glass film is employed. As a method for forming the above-mentioned mask film, a sputtering method is preferably employed, but other film-forming method may also be employed. Consequently, on the mask film, a resist film is formed by e.g. spin coating, and the resist film is irradiated with ultraviolet rays to expose a desired pattern, and developed to form a desired pattern in the resist film. By using the resist pattern, the mask film is patterned by dry etching, and subjected to dry etching (ashing treatment) using an oxygen gas or a wet removal treatment using e.g. a remover solution to remove the resist film, to thereby obtain a mask having a desired pattern.

The composition of the above-mentioned mask film is that atomic % of W is 25 to 65% based on total number of atoms of W and Si.

In a composition in which the amount of W exceeds 65 atomic %, adhesiveness of the mask film to the glass film becomes insufficient, which may cause a problem that a stress of mask film causes to peel off the mask from the substrate or to form a crack in the film. Further, since a bullion of W is expensive, material cost increases, which is not preferable in terms of cost.

If the above-mentioned W amount is less than 25 atomic %, selectivity, namely, the ratio between etching rates of the glass film and the mask film, is small, and thus, the mask film is etched to increase wearing amount of the mask film during patterning of the glass film. Accordingly, it is necessary to increase the thickness of the mask film, which causes a problem that forming of mask film takes long time or material cost increases due to the film thickness.

The selectivity is preferably at least 2, more preferably at least 2.5.

In a case of forming a mask film made of an alloy of W and Si by sputtering, purity of target to be used for the sputtering is preferably at least 99.5%. When the target contains as impurity an element had to be dry etched, the glass may not be patterned smoothly or may not be patterned as designed. The purity is more preferably at least 99.9%.

Forming of the mask film by sputtering is preferably carried out in argon gas, but there is no problem if it is carried out in an inert gas. If an oxidizing gas is mixed, the alloy is oxidized, and accordingly, the mask film is etched to increase wearing amount of the mask film at a time of dry etching the glass film, and desired selectivity may not be obtained. The purity of gas to be used for the sputtering is preferably at least 99.995%, more preferably at least 99.999%.

Film-forming pressure is preferably from 0.2 to 10 Pa. If the pressure is less than 0.2 Pa, plasma tends to be unstable, or a film pressure tends to increase which may cause peeling of the film. If the pressure exceeds 10 Pa, the film quality is deteriorated, and the above-mentioned wearing of mask film increases and desired selectivity may not be obtained.

The sputtering is preferably a DC sputtering rather than an RF sputtering. This is because film peeling scarcely occurs in a DC sputtered film. Further, input power density (power applied to a unit target size) is preferably 2.5 to 7 $W/cm^2$. When the input power density is lower than 2.5 $W/cm^2$, it takes extremely long time to obtain desired film thickness, which is not practical. Further, if the input power density exceeds 7 $W/cm^2$, abnormal arcing tends to occur, which may cause a pinhole in the make film to cause patterning defect.

Substrate temperature at a time of forming a mask film, is preferably within a range of from a room temperature (25° C.) to 300° C. If the substrate is heated to more than 300° C., film-peeling may occur in a cooling step.

The thickness of the mask film is inevitably decided by an etching depth of a glass to be dry etched and a selectivity, but if the thickness of the mask film is less than 0.1 µm, heating by plasma tends to influence during dry etching of the glass film, and wearing of masking member by etching is accelerated, which may cause patterning defect. Further, if the thickness of the mask film exceeds 3 µm, resist thickness required for patterning of the mask film increases, which may make it difficult to achieve patterning as designed. Accordingly, the thickness of the mask film is preferably from 0.1 to 3 µm.

The dry etching of the mask film can be made by carrying out Reactive Ion Etching, Reactive Ion Beam Etching, Inductively Coupled Plasma Etching (hereinafter referred to as ICP etching), Neutral Loop Discharge etching (hereinafter referred to as NLD etching) or the like using chlorine type gas or fluoride gas such as $Cl_2$, $CF_4$, $CHF_3$, $C_3F_8$, $C_4F_8$, $NF_3$ or $SF_6$.

Subsequently, desired patterning is made on the glass film or the glass by dry etching.

Etching to the glass film or the glass, is preferably made by dry etching the material using NLD etching in a mixed gas atmosphere of a fluoride gas such as $CF_4$, $CHF_3$, $C_3F_8$ or $C_4F_8$ with Ar gas. At this time, flow rate ratio of the fluoride gas is preferably from 5 to 22% based on total flow rate of the fluoride gas and Ar gas. When the flow rate ratio of the fluoride gas is larger than 22%, particles may increase to increase light scattering when the optical waveguide is completed, or dry etching speed may decrease. On the other hand, if the flow rate ratio is smaller than 5%, streak-shaped roughness occurs to side walls formed by dry etching, which may cause light scattering when the optical waveguide is completed.

An example of dry etching conditions to the glass or to the glass film, is as follows. An apparatus to be used is a plasma etching apparatus NLD500 manufactured by ULVAC Inc., flow rates of Ar gas and $C_3F_8$ gas are 45 cm$^3$/min and 5 cm$^3$/min respectively as converted as standard conditions, the pressure is 0.2 Pa, the antenna power is 1,200 W, bias power is 250 W, and electric currents of three neutral magnetic field generation coils arranged in vertical direction of a chamber are 10 A, 16.7 A and 10 A respectively for the top, substrate temperature is 20° C. and the like. In this condition, the glass film of 4 µm thick can be etched in 15 minutes. Of course the above-mentioned condition is an example, and the condition is not limited thereto.

FIG. 1 shows an enlarged cross-sectional view in the vicinity of a core of a glass optical waveguide of the present invention. A reference numeral 31 indicates a core, 32 indicates a clad, 32a indicates an underlayer clad film, 32b indicates an upperlayer clad film and 33 indicates a substrate. Cross-sectional shape of the core after etching is a trapezoid. The reason that the shape is not rectangle but a trapezoid is as follows. A glass or a glass film of the present invention which contains at least one glass-constituting oxide selected from the group consisting of $Bi_2O_3$, $Sb_2O_3$, PbO, $SnO_2$ and $TeO_2$, produces low-volatile reaction product by dry etching. For this reason, etching for physically removing the reaction product by using Ar ion is carried out in parallel with reactive ion etching. During the etching step, etching of glass and adhesion of reaction product to side walls of the core occur repeatedly.

If the core shape is trapezoidal, physical etching using Ar ion is possible even if a reaction product is adhered to core side walls, and smooth side walls can be obtained, but if the core has a steep structure such that the shape is rectangle, it becomes impossible to physically remove the reaction product adhered to core side walls, and side walls of the pattern do not become smooth. In the trapezoidal shape, among four sides constituting the trapezoid, angles A and B of two oblique sides to a long side are each within a range of from 60 to 80°, more preferably within a range of from 65 to 76°. If the angles A and B exceeds 80°, it is not possible to remove a reaction product produced by reaction of components constituting the glass film with an etching gas, which may prevent smooth etching. If the angles are lower than 60°, coupling loss with an input/output element may increase.

Methods for forming a core includes a press method besides the dry etching method. In the press method, a substrate is heated to a temperature at which the substrate deforms, and the substrate is pressed by a metal mold to form a core. For this reason, there is a problem that the substrate is warped or a stress is formed in the substrate. Further, since the press-molding is carried out after the underlayer clad and the core are formed on the substrate, a concavo-convex shape can be obtained, but since a pressed core film remains in a lateral side of a core, refractive index structure of the core and the clad becomes complicated, and thus, such a structure does not sufficiently function as a waveguide. On the other hand, in the dry etching method, there is no problem of deformation or warping of the substrate, and the core film is removed by etching except for a portion to be left as a core, and accordingly, core-clad structure can be simple. In particular, since the above-mentioned angles A and B are each within a range of from 60 to 80°, reaction product of glass film components with an etching gas, which is an attachment in the vicinity of side walls of the core, is sufficiently removed, and extremely smooth side walls can be obtained.

After the glass or the glass film is patterned, the mask film is removed by dry etching using a chlorine type or a fluoride type gas. The dry etching is carried out by using a method of reactive ion etching, reactive ion beam etching, ICP etching, NLD etching or the like in a gas atmosphere of chlorine type or fluoride type such as $Cl_2$, $CF_4$, $CHF_3$, $C_3F_8$, $C_4F_8$, $NF_3$ or $SF_6$. Oxygen may be added to the etching gas.

<Forming of Glass Optical Waveguide>

By the microfabrication method of the present invention, a $Bi_2O_3$ etc.—containing glass film is patterned to form a core, whereby a glass optical amplifying waveguide to be employed for WDM optical communication can be formed. In this optical amplifying waveguide, under the presence of exciting light, a signal light of e.g. 1.45 to 1.64 µm wavelength propagating in a core glass is amplified. The optical waveguide formed by the microfabrication method of the present invention, is not limited thereto, and for example, the present invention may be applied to forming of e.g. a nonlinear optical waveguide. Forming of an optical amplifying waveguide is described as follows.

The refractive index $n_1$ of a glass film to be a core, is preferably at least 1.7. This is because light amplification by the above-mentioned glass is produced by induced emission of light of signal light wavelength which is induced by excitation light, and accordingly, the larger the refractive index is, the larger the gain becomes. If the refractive index is less than 1.7, gain coefficient or nonlinearity may decrease. More preferably, $n_1$ is at least 1.8, usually at most 2.3. Here, refractive index in this specification means a refractive index in a wavelength band in which the optical waveguide of the present invention is used.

A clad is not particularly limited so long as it can enclose light in the core, but the refractive index $n_2$ of the clad preferably satisfies an equation $0.0003 \leq \Delta n/n_1 \leq 0.1$ provided that the refractive index difference $n_1 - n_2$ between the core and the clad is designated as $\Delta n$. If a value produced by dividing the refractive index difference between the core and the clad by the refractive index of the core, namely, $\Delta n/n_1$ is less than 0.0003, it may become difficult to enclose light in the core. In this case, light diverges as it is propagated, and a large loss occurs at a connection with an output device (for example, a single mode fiber for output) at an output end. Further, in a case of producing a curved waveguide (a waveguide having a curved portion), if propagated light can not be enclosed in the waveguide, a part of propagation light is radiated by the curve, which may increase transmission loss. $\Delta n/n_1$ is at least 0.0003, more preferably at least 0.001, particularly preferably at least 0.003.

On the other hand, if $\Delta n/n_1$ exceeds 0.1, it becomes difficult to propagate light in single mode, and the propagation mode may become multimode. If the propagation mode becomes multimode, propagation speeds in the axis direction (group velocities) are different between light beams of a different modes constituting the multi mode, and accordingly, even though the light beams are propagated in the same direction, arrival times at an output end are different depending on the mode even the distance is the same, which disperses power of light. If the dispersion is large, shape of each pulse in a high speed pulse signal is rounded to be undistinguishable from adjacent pulses. Accordingly, high speed transmission may not be possible. $\Delta n/n_1$ is at most 0.1, more preferably at most 0.08, particularly preferably at most 0.05.

In a case where the core is in the above-mentioned typical composition range, the clad is preferably in the same composition range as the above-mentioned composition range except that the clad contains neither $Er_2O_3$ nor $Tm_2O_3$. If the composition ranges of the core and the clad are different, glass transition temperature, expansion coefficient, softening temperature and the like are different, thermal stress is formed in the heating or the cooling step, which may cause film-peeling or residual stress in the process of producing the waveguide. If their thermal characteristics are not significantly different and if the refractive indices can be adjusted in the above-mentioned range, the clad is not necessarily limited to the above-mentioned composition range.

In the optical amplifying waveguide, the core is formed on the underlayer clad, and after the core is subjected to microfabrication by the method of the present invention, an upper layer clad is formed on the core. The thicknesses of the core and the clad are preferably from 0.3 to 10 μm and from 2 to 60 μm respectively, and the thickness of the underlayer clad is typically from 1 to 30 μm, the thickness of the upper layer clad is typically from 1 to 30 μm, but they are not limited to the above-mentioned ranges.

As methods for forming the underlayer clad film and the upper layer clad film, various methods mentioned as methods for forming a core glass film may be applied, but in the same manner as the core glass film, a sputtering method is preferred since these films are glass films having 4 or at least 5 constituents.

Namely, on a substrate, a first film is formed to be an underlayer clad film (which corresponds to a glass thin film 32a) by a sputtering method first, a second film is formed to be a core (which corresponds to a core 31 in FIG. 1). Here, a target whose composition is adjusted to obtain desired film composition, is used. Further, in order to protect the core film from damage due to dry etching process, the above-mentioned upper layer clad film may be formed on the core as a protection film. In a case of employing such a protection film, its thickness is preferably from 25 to 1,000 nm. If the thickness of the protection film is larger than 1,000 nm, total thickness of the core film and the protection film to be etched by dry etching becomes large, which may significantly increase dry etching time. If the thickness of the protection film is smaller than 25 nm, the effect of protection of the core film from damage may not be sufficiently obtained in a case where such a protection is required.

On the second film or the protection film, a mask film made of an alloy of W and Si is formed. As the method for forming the mask film made of an alloy of W and Si, a sputtering method is preferably used. Consequently, on the mask film, a resist film is formed by using spin coating method, the resist film is irradiated with ultraviolet rays using a photomask of desired pattern, the resist is developed to form a desired pattern in the resist film, and using the pattern of the resist film, the mask film is dry etched, and finally, the resist film is removed by dry etching using oxygen gas or by removal treatment by a remover solution, to obtain a mask having a desired pattern.

Dry etching of the mask film is carried out using reactive ion etching, reactive ion beam etching, ICP etching, NLD etching or the like using a chlorine type or a fluoride type gas such as $Cl_2$, $CF_4$, $CHF_3$, $C_3F_8$, $C_4F_8$, $NF_3$ or $SF_6$.

Subsequently, the above-mentioned second film is dry etched in the same manner as the case of etching of the above-mentioned glass film, to form a desired core pattern. In a case where the protection film is employed, the protection film is also dry etched together to achieve the patterning. In a case where a glass film is subjected to microfabrication to produce a core, etching is preferably carried out not only until the etching of core film is completed but also until the etching enters into the underlayer clad formed under the core film. Further, in a case of forming a core from a core film covered with a protection film, the etching is preferably carried out from the protection film through the core film until the etching enters into the underlayer clad. In a case where the etching is carried out until the etching enters into the underlayer clad, removal amount of the underlayer clad is preferably at most 2 μm. If more than 2 μm of the underlayer clad is etched, the thickness of the upper layer clad covering the core becomes unnecessarily thick, such being not preferred.

Further, in the same manner as the case of etching the glass film, the mask film is removed by a dry etching method and further, using a sputtering method, an upper layer clad film (which corresponds to a glass thin film 32b in FIG. 1). After the upper clad film is formed, an annealing treatment may be carried out in an oxygen atmosphere.

As the case requires, other elements are formed on the substrate, and finally, the substrate is cut into a desired size.

As the glass-constituting oxide of the core, the glass optical waveguide of the present invention containing at least one of Er and Tm as the glass-constituting oxide of the core, can be employed as a laser medium for laser emission. In order to emit a laser using the glass optical waveguide of the present invention as a laser medium for laser emission, a Fabry-Perot type resonator may be employed, in which mirrors having high reflectivity for light of wavelength of laser emission are formed on both ends of the glass optical waveguide of the present invention to be used as laser medium (hereinafter referred to as optical waveguide type laser medium of the present invention), but other constructions may also be applied. In the case of using the construction of Fabry-Perot type resonator, exciting light is incident into one of the end faces from an external light source (hereinafter the end is referred to as exciting light input end), whereby at least one of Er and Tm contained in the core of the optical waveguide type laser medium of the present invention, functions as laser activated ion and emits light when it receives exciting light, which causes laser emission, and laser light can be taken out from the other end (hereinafter referred to as laser light output end).

The mirror formed on the exciting light input end, preferably has high reflectivity for emission light to facilitate emission. The reflectivity is preferably at least 90%, more preferably at least 99%. Further, when the transmittance for excitation light is high, loss of excitation light by reflection is reduced to increase excitation energy input into the laser medium, such being preferred. The transmittance is preferably at least 99%, more preferably at least 99.5%.

The mirror formed on the laser light output end, typically has a reflectivity of at least 40% for emission light, but the reflectivity is preferably optimized depending on e.g. gain of laser medium.

As such a mirror, a dielectric multilayer film is mentioned as a preferred example, which is formed by employing $SiO_2$ as low refractive index layer material and $Ta_2O_3$ as high refractive index layer material, whose layer thicknesses are designed to obtain the above-mentioned optical characteristics at an exciting light source wavelength and laser emission wavelength, and laminating these layers. However, the mirror is not limited thereto.

The method of inputting exciting light from the exciting light source into the optical waveguide, may be a method of converging light from exciting light source of spatial output by e.g. an objective lens and inputting the light into the waveguide, or the method of using a fiber output type exciting light source and inputting light into the waveguide by a fiber, and the method is not particularly limited.

In a case where a glass-constituting composition of a core to be employed in an optical waveguide type laser medium of the present invention contains at least 35% in mass % of at least one type of oxide selected from the group consisting of $Bi_2O_3$, $Sb_2O_3$, PbO, $SnO_2$ and $TeO_2$, more preferably $Bi_2O_3$, and the composition further contains the above-mentioned Er as laser activation ion, emission light of wavelength 1,530 nm can be obtained when the above-mentioned mirror has high transmittance for light of wavelength 980 nm and has a desired reflectivity for light of wavelength 1,530 nm and when the exciting light of wavelength 980 nm is used. As a light source for emitting this exciting light, a semiconductor laser light having an emission wavelength of 980 nm band may be mentioned. In a case where Tm ion is used as laser activation ion instead of Er ion, with exciting light of 800 nm wavelength band, laser light of 1,800 nm wavelength band can be obtained. In this case, optical characteristics of the mirrors are assumed to be adjusted to exciting light wavelength and emission light wavelength to be used. When Yb ion is employed as a laser activation ion instead of the above-mentioned Er ion and Tm ion, 980 nm band emitting from the semiconductor laser is used as exciting light, to obtain laser emission of 1,060 nm wavelength band. Further, when Ho ion is used, light of 1,100 nm band emitted from a Raman fiber laser or a Yb fiber laser is used as exciting light, to obtain laser emissions of 2,000 nm band and 3,000 nm band. By these methods, laser light of the respective wavelengths are obtained.

In a case where the glass optical waveguide of the present invention is used as a laser medium for emitting laser, a glass composition is employed, which contains at least one of Er and Tm in addition to a glass composition consists essentially of the above-mentioned $Bi_2O_3$, $SiO_2$, $Ga_2O_3$, $Al_2O_3$ and $Yb_2O_3$ as the glass-constituting oxide of the core. Further, the composition may contain Yb and Ho instead of Er and Tm. Namely, the composition may contain any one type of oxides of the elements selected from the group consisting of Er, Tm, Yb and Ho, or the composition may contain at least two types of such oxides at the same time. Content amount of Er, Tm, Yb and Ho (in a case of containing at least two types at the same time, total content amount of these) is preferably from 0.01 to 10%. In order to carry out laser emission of sufficient strength, the content is at least 0.01%. If the content exceeds 10%, it becomes difficult to form a glass, and thus, the content is preferably at most 10%. Further, if the content exceeds 5%, density extinction tends to occur to lower light amplification rate, and accordingly, the content is more preferably from 0.01 to 5%, further preferably from 0.1 to 2%.

The core glass film to be employed as a laser medium for laser emission, preferably contains at least 0.5% of $La_2O_3$ in addition to the above-mentioned composition, which improves dispersion of Er ion, Tm ion, Yb ion or Ho ion which are laser activators. Further, if the content of $La_2O_3$ exceeds 5%, devitrification tends to occur, and thus, the content is preferably at most 5%.

EXAMPLES

In the following, the present invention is more specifically described with reference to Examples, but the following description do not limit the present invention.

A composition shown in FIG. 1 in mass % is produced by preparing powder chemicals manufactured by Kojundo Chemical Laboratory Co. Ltd. that are $Bi_2O_3$ (purity 99.999%, grain size 20 μm), $SiO_2$ (purity 99.9%, grain size 4 μm), $Ga_2O_3$ (purity 99.9%), $Al_2O_3$ (purity 99.9%), $B_2O_3$ (purity 99.9%), $La_2O_3$ (purity 99.9%), $Er_2O_3$ (purity 99.9%) and $CeO_2$ (purity 99.9%), and the materials are dry-mixed by a mortar, melted in an electric furnace heated to 1,150° C., and flown out on a stainless plate to obtain a glass of 101.6 mm in diameter. The obtained glass is ground to have a thickness of 3 mm, and thereafter, bonded to a backing plate for sputtering by employing indium as an adhesive agent, to prepare sputtering targets T1 and T2.

A glass film formed by using these targets is patterned by dry etching to prepare a waveguide and the waveguide is evaluated. Examples 1, 2, 5 and 6 are Examples of the present invention and Examples 3 and 4 are Comparative Examples.

TABLE 1

|  | T1 | T2 |
| --- | --- | --- |
| $Bi_2O_3$ | 75.5 | 77.0 |
| $SiO_2$ | 7.8 | 8.0 |
| $Ga_2O_3$ | 12.7 | 10.3 |
| $Al_2O_3$ | 1.4 | 2.8 |
| $La_2O_3$ | 1.8 | 1.8 |
| $CeO_2$ | 0.1 | 0.1 |
| $Er_2O_3$ | 0.7 | 0 |

Example 1

On a soda lime silica glass disc-shaped substrate 11 (1 mm thick, 76.2 mm in diameter), an underlayer clad film 12 of 6.6 μm thick was formed. Namely, using a T2 target, sputtering was carried out under the conditions that the substrate temperature was 20° C., argon and oxygen as sputtering gases were flown at flow rates of 30 cm³/min and 0.5 cm³/min respectively as converted as standard conditions, the pressure was 0.3 Pa, applied RF power was 100 W and sputtering time was 66 hours. When X-ray diffraction measurement was made to a glass film formed on the substrate, no peak was recognized in a diffraction pattern, and it was confirmed that the glass film was amorphous.

Then, a core film 13 of 3.3 μm thick was formed on the underlayer clad film. Namely, using a T1 target, sputtering was carried out under the conditions that the substrate temperature was 20° C., argon and oxygen as sputtering gases were flown at flow rates of 30 cm³/min and 0.75 cm³/min respectively in terms of values under standard conditions, the pressure is 0.3 Pa, applied RF power was 100

W and sputtering time was 21 hours. When an X-ray diffraction measurement was made to a glass film formed on the substrate, no peak was recognized on a diffraction pattern, and it was confirmed that the glass film was amorphous. Further, the amount of $Bi_2O_3$ in mass % was 74.1%.

Then, on the core film 13, a protection film (a film to be an upper layer clad) of 300 nm was formed. Namely, using a T2 target, sputtering was carried out under the conditions that the substrate temperature was 20° C., argon and oxygen as sputtering gases were flown at flow rates of 30 $cm^3$/min and 0.5 $cm^3$/min respectively in terms of values under standard conditions, the pressure was 0.3 Pa, applied RF power was 100 W and sputtering time was 3 hours.

Then, using a $W_6Si_4$ target of 101.6 mm in diameter, a mask film 14 of 1.3 µm thick was formed. Namely, sputtering was carried out under the conditions that the substrate temperature was 20° C., argon as a sputtering gas was flown at a flow rate of 10 $cm^3$/min as converted as standard conditions, the pressure was 2 Pa, input DC electric power was 300 W and sputtering time was 100 minutes.

Then, on the mask film 14, a positive resist film of 2.4 µm thick was formed by using a spin coating method. The positive resist film was prebaked on a hot plate of 96° C., and irradiated with ultraviolet rays of wavelength 436 nm by using a mask aligner, to form a pattern constituted by 30 pieces of linear core patterns of 3 to 8 µm wide and 50 to 76 mm long arranged in a pitch of 125 µm on the positive resist film. Portions of the positive resist film irradiated with ultraviolet rays are removed by a developing solution, and dry etching was carried out by using an ICP etching apparatus NE550 (manufactured by ULVAC Inc.). The dry etching was carried out for 9 minutes under the conditions that flow rates of $CHF_3$ gas and $SF_6$ gas were 25 $cm^3$/min and 5 $cm^3$/ min respectively in terms of values under standard conditions, the pressure was 0.5 Pa, antenna power was 800 W, bias power was 20 W and substrate temperature was 20° C., to carry out patterning of the mask film 14.

Then the resist on the mask film 14 was removed by a remover solution, and an ashing treatment was carried out under the following conditions using the above-mentioned ICP etching apparatus. Namely, the ashing treatment was carried out for 5 minutes under the conditions that substrate temperature was 20° C., oxygen as an ashing gas was flown at 20 $cm^3$/min in terms of a value under standard conditions, the pressure was 1 Pa, antenna power was 300 W and bias power was 10 W, to remove the resist.

Then, dry etching was carried out using a magnetic neutral loop discharge plasma etching apparatus NLD500, to pattern the core glass film. The dry etching was carried out in a flow of mixed gas of Ar gas and 10% of fluoride gas in terms of flow rate ratio. Namely, flow rates of Ar gas and $C_3F_8$ gas were 45 $cm^3$/min and 5 $cm^3$/min respectively in terms of values under standard conditions. Further, the pressure was 0.2 Pa, discharge electric power was 1,200 W in terms of antenna power and 250 W in terms of bias power, electric currents of three neutral-magnetic-field-generation coils arranged in a vertical direction of a chamber were 10 A, 16.7 A and 10 A respectively from the top, and substrate temperature was 25° C.

Dry etching treatment was carried out for 10 minutes under the above conditions. Thereafter, the sample was once taken out, a Si substrate was set on the apparatus, and subjected to a plasma treatment for 30 minutes under the conditions that flow rates of $O_2$ gas and $C_3F_8$ gas were 100 $cm^3$/min and 5 $cm^3$/min respectively, antenna power was 1,000 W, bias power was 0 W, and thereafter, subjected to another plasma treatment for 30 minutes under the same conditions except that bias power of 20 W was applied, and thereafter, $N_2$ gas purging and evacuation were repeated 30 times. The sample subjected to 10 minutes of etching was set on the apparatus again, and subjected to core etching for 10 minutes under the same conditions of the above-mentioned core etching conditions. Side walls and a cross section of a core pattern after dry etching was observed by SEM, and it was observed that there was no adhered matter in the vicinity of side walls and etching was made smoothly. Further, the shape of core pattern not containing the mask film 14, was such that the dimensions of upper side and lower side and the height (etching depth) were 3.1 µm, 6.0 µm and 4.2 µm respectively, and angles A and B of FIG. 1 were each 71°. Namely, a core having a trapezoidal cross section was formed in which the upper side, the lower side and the height were 3.3 µm, 5.5 µm and 3.3 µm respectively and the angles A and B of FIG. 1 were each 71°.

Then, by the above-mentioned ICP etching apparatus, the metal mask was removed under the following conditions. Namely, etching was carried out for 4 minutes under the conditions that $SF_6$ gas flow rate was 20 $cm^3$/min, pressure was 0.5 Pa, antenna power was 800 W, bias power was 20 W and substrate temperature was 20° C., to remove the mask film.

Then, on a glass fabricated to have concavo-convex shape, an upper layer clad film of 6.6 µm thick was formed. Namely, using a T2 target, sputtering was carried out under the conditions that argon and oxygen as sputtering gases were flown at flow rates of 30 $cm^3$/min and 0.5 $cm^3$/min respectively in terms of values under standard conditions, the pressure was 0.3 Pa, applied RF power was 100 W and sputtering time was 66 hours.

The linear waveguide thus produced was set on a vacuum chamber, a thermal treatment was carried out under the conditions that oxygen gas was flown at a flow rate of 5 $cm^3$/min as converted as standard conditions and the pressure was maintained to be 0.2 torr, in which the waveguide was heated to 500° C. at a rate of temperature rising of 5° C./min, maintained in that state for 3 hours, and cooled at a rate of temperature cooling of 5° C./min. At this time, refractive indices of the core film and the clad film were 1.921 and 1.911 respectively. The waveguide obtained was cut by a dicing apparatus, and cut surface of the waveguide were polished to form mirror-like finished surfaces. Using waveguides of different lengths, loses of the respective waveguides were measured, and as a result, loss of the waveguide itself was 0.2 dB/cm.

Example 2

On a soda lime silica glass disc-shaped substrate 11 (1 mm thick, 76.2 mm in diameter), an underlayer clad film 12 of 8.4 µm thick was formed. Namely, using a T2 target, sputtering was carried out under the conditions that the substrate temperature was 20° C., argon and oxygen as sputtering gases were flown at 30 $cm^3$/min and 0.75 $cm^3$/min respectively in terms of values under standard conditions, the pressure was 0.3 Pa, applied RF power was 100 W and sputtering time was 60 hours. When an X-ray diffraction measurement of the glass film formed on the substrate was carried out, no peak was recognized in the diffraction pattern and it was confirmed that the glass film was amorphous.

Then, on the underlayer clad film, a core film 13 of 3.3 µm thick was formed. Namely, using a T2 target, sputtering was carried out under the conditions that substrate temperature was 20° C., argon and oxygen as sputtering gases were flown at flow rate of 30 $cm^3$/min and 0.5 $cm^3$/min respectively in terms of values under standard conditions, the pressure was 0.3 Pa, applied RF power was 100 W, and sputtering time was 35 hours. When X-ray diffraction measurement of the glass film formed on the substrate was carried out, no peak was recognized in a diffraction pattern, and it was confirmed that the glass film was amorphous. Further, the amount of $Bi_2O_3$ in mass % was 75.6%.

Then, on the core film 13, a protection film (a film to be an upper layer clad) of 300 nm thick was formed. Namely, using a T2 target, sputtering was carried out under the conditions that substrate temperature was 20° C., argon and oxygen as sputtering gases were flown at flow rates of 30 $cm^3$/min and 0.75 $cm^3$/min respectively in terms of values under standard conditions, the pressure is was 0.3 Pa, applied RF power was 100 W and sputtering time was 2 hours and 10 minutes.

Then, using a $W_6Si_4$ target of 101.6 mm in diameter, a mask film 14 of 1.3 µm thick was formed. Namely, sputtering was carried out under the conditions that substrate temperature was 20° C., argon as a sputtering gas was flown at a flow rate of 10 $cm^3$/min in terms of a value under standard conditions, the pressure was 2 Pa, input DC electric current was 300 W and sputtering time was 100 minutes.

Then, on the mask film 14, a positive resist film of 2.4 µm thick was formed by a spin coating method. The positive resist film was prebaked on a hot plate of 96° C., and irradiated with ultraviolet rays of wavelength 436 nm by using a mask aligner, to form a pattern constituted by 30 pieces of linear core patterns of 3 to 8 µm wide and 50 to 76 µm long arranged in a pitch of 125 µm. Portions of the positive resist film irradiated with ultraviolet rays were removed by a developing solution, and subsequently, dry etching was carried out by a ICP etching apparatus NE550 (manufactured by ULVAC Inc.). The dry etching was carried out for 9 minutes under the conditions that flow rates of $CHF_3$ gas and $SF_6$ gas were 25 $cm^3$/min and 5 $cm^3$/min respectively in terms of values under standard conditions, the pressure was 0.5 Pa, antenna power was 800 W, bias power was 20 W and substrate temperature was 20° C., to carry out patterning of the mask film 14.

Then, the resist on the mask film 14 was removed by a remover solution, ashing treatment was carried out under the following conditions by the above-mentioned ICP etching apparatus. Namely, ashing treatment was carried out for 5 minutes under the conditions that substrate temperature was 20° C., oxygen as an ashing gas was flown at 20 $cm^3$/min in terms of a value under standard conditions, the pressure was 1 Pa, antenna power was 300 W and bias power was 10 W, to remove the resist.

Then, dry etching was carried out by using a magnetic neutral loop discharge plasma etching apparatus NLD500, to pattern the core glass film. The dry etching was carried out in a flow of mixed gas of Ar gas and 10% of fluoride gas in terms of flow rate ratio. Namely, flow rates of Ar gas and $C_3F_8$ gas were 49.5 $cm^3$/min and 5.5 $cm^3$/min respectively in terms of values under standard conditions. Further, at this time, the pressure was 0.2 Pa, discharge electric power was 1,200 W in terms of antenna power and 250 W in terms of bias power, and the currents of three neutral magnetic field generation coils arranged in vertical direction of a chamber, were 10 A, 12.5 A and 10 A respectively, and substrate temperature was 25° C. The dry etching treatment was carried out under the above conditions for 35 minutes.

When side walls and a cross section of a core pattern after dry etching was observed by SEM, no adhered matter was observed in the vicinity of the side walls and etching was made smoothly. Further, the shape of the core pattern not including the mask film 14 was such that the upper side, the lower side and the height (etching depth) were 5.8 µm, 7.5 µm and 3.5 µm respectively, and angles A and B of FIG. 1 were each 71°. Namely, a core having a trapezoidal cross section was formed, in which the upper side, the lower side and the height were 5.9 µm, 7.5 µm and 3.3 µm respectively and the angles A and B of FIG. 1 were each 71°.

Then, by using the above-mentioned ICP etching apparatus, the metal mask was removed under the following conditions. Namely, etching was carried out for 5 minutes under the conditions that $SF_6$ gas was 20 $cm^3$/min, the pressure was 0.5 Pa, antenna power was 800 W, bias power was 20 W and substrate temperature was 20° C., to remove the mask film.

Then, on the glass on which concavo-convex fabrication was made, an upper layer clad film of 6.6 µm thick was formed. Namely, using a T2 target, sputtering was carried out under the conditions that substrate temperature was 20° C., argon and oxygen as sputtering gases were flown at flow rates of 30 $cm^3$/min and 0.75 $cm^3$/min respectively in terms of values under standard conditions, the pressure was 0.3 Pa, applied RF power was 100 W and sputtering time was 60 hours.

The linear waveguide thus produced was set on a vacuum chamber, and under the conditions that oxygen gas was flown at a flow rate of 5 $cm^3$/min in terms of a value under standard conditions and the pressure was maintained to be 0.2 torr, a heat treatment was carried out, in which the linear waveguide was heated to 500° C. at a rate of temperature rising of 5° C./min, maintained the state for 3 hours and cooled at a rate of temperature cooling of 5° C./min. At this time, refractive indices of the core film and the clad film were 1.915 and 1.899 respectively. The waveguide thus obtained was cut by a dicing apparatus, and its end faces were polished to be mirror-like finished surfaces. Using waveguides of different lengths, loses of the respective waveguides are measured, and as a result, loss of the waveguide itself was 0.2 dB/cm.

Example 3

Using a target T2, sputtering was carried out under the same conditions as those of Example 2 to form, on a soda lime silica glass substrate, an underlayer clad, a core and a protection film which becomes an upper layer clad, were formed and a mask film of 1.3 µm thick was formed under the same conditions, and thereafter, etching was carried out under the same conditions of Example 2 to pattern the mask.

Subsequently, resist on the mask film was removed under the same conditions of Example 2, and using the mask film thus patterned, the glass film was NLD etched under the following conditions. Namely, flow rates of AR gas and $C_3F_8$ gas were 49.5 $cm^3$/min and 5.5 $cm^3$/min respectively in terms of values under standard conditions. Further, at this time, the pressure was 0.2 Pa, discharge electric power was 1,000 W in terms of antenna power and 250 W in terms of bias power, currents of three neutral magnetic field generation coils arranged in vertical direction of a chamber were 20 A, 25.5 A and 20 A respectively from the top and substrate temperature was 25° C. The dry etching treatment was carried out under the above conditions for 10 minutes. A cross section of a core after the dry etching was observed by SEM, and it was confirmed that adhered matter was present in the vicinity of side walls, and etched side walls were rough, which may cause light scattering. Further, the shape of the core pattern not including the mask film 14 was such that the upper side, the lower side and the height (etching depth) were 3.6 μm, 4.0 μm and 1.9 μm respectively, and angles A and B of FIG. 1 were each 84°.

Then, by the above-mentioned ICP etching apparatus, the metal mask was removed under the following conditions. Namely, etching was carried out for 5 minutes under the conditions that $SF_6$ gas was 20 $cm^3$/min, the pressure was 0.5 Pa, antenna power was 800 W, bias power was 20 W and substrate temperature was 20° C., to remove the mask film.

Then, on the glass subjected to concavo-convex treatment, an upper layer clad film of 6.6 μm thick was formed. Namely, using a T2 target, sputtering was carried out under the conditions that the substrate temperature was 20° C., argon and oxygen as sputtering gases were flown at 30 $cm^3$/min and 0.75 $cm^3$/min respectively in terms of values under standard conditions, the pressure was 0.3 Pa, applied RF power was 100 W and sputtering time was 60 hours.

The linear waveguide thus produced was set in a vacuum chamber, under the conditions that oxygen gas was flown at 5 $cm^3$/min in terms of a value under standard conditions and the pressure was maintained to be 0.2 torr, thermal treatment was carried out in which the linear waveguide was heated to 500° C. at a rate of temperature rising of 5° C./min, maintained in this state for 3 hours and cooled at a rate of temperature cooling of 5° C./min. At this time, refractive indices of the core film and the clad film were 1.915 and 1.899 respectively. The waveguide obtained was cut by a dicing apparatus, and its end faces were polished to be mirror-like finished surfaces. Using waveguides of different lengths, losses of the respective waveguides were measured and, as a result, loss of the waveguide itself was 3 dB/cm.

Example 4

Sputtering was carried out under the same conditions as those of Example 1 to form, on a soda lime silica glass substrate, an underlayer clad, a core and a protection film to form an upperlayer clad, and a mask film of 1.3 μm thick was formed under the same conditions as those of Example 1, etching was carried out under the same conditions as those of Example 1 to pattern the mask.

Subsequently, resist on the mask film was removed under the same conditions as those of Example 1, and using the patterned mask film, the glass film was NLD etched under the following conditions. Namely, flow rates of AR gas and $CHF_3$ gas were 90 $cm^3$/min and 10 $cm^3$/min respectively in terms of values under standard conditions. Further, at this time, the pressure was 0.4 Pa, discharge electric power was 1,000 W in terms of antenna power and 260 W in terms of bias power, and currents of three neutral magnetic field generation coils arranged in a vertical direction of a chamber were 10 A, 16.7 A and 10 A respectively from the top, and substrate temperature was 25° C. The dry etching treatment was carried out under the above conditions for 10 minutes. When the cross section of the core after the dry etching was observed by SEM, adhered matter was present in the vicinity of side walls and etched side walls were rough, and it was confirmed that the condition may cause light scattering. Further, the shape of core pattern not including the mask film 14 was such that the upper side, the lower side and the height (etching depth) were 6.1 μm, 6.7 μm and 1.8 μm respectively, and angles A and B of FIG. 1 were each 81°.

Then, by the above-mentioned ICP etching apparatus, the metal mask was removed under the following conditions. Namely, etching was carried out under the conditions that $SF_6$ gas was 20 $cm^3$/min, the pressure was 0.5 Pa, antenna power was 800 W, bias power was 20 W and substrate temperature was 20° C., for 5 minutes to remove the mask film.

Then, on the glass subjected to concavo-convex fabrication, an upper layer clad film of 6.6 μm thick was formed. Namely, using a T2 target, sputtering was carried out under the conditions that substrate temperature was 20° C., argon and oxygen as sputtering gases were flown at flown rate of 30 $cm^3$/min and 0.5 $cm^3$/min respectively in terms of values under standard conditions, the pressure was 0.3 Pa, applied RF power was 100 W and sputtering time was 66 hours.

The linear waveguide thus produced was set in a vacuum chamber, under the conditions that oxygen gas was flown at 5 $cm^3$/min in terms of a value under standard conditions and the pressure was maintained to be 0.2 torr, a heat treatment was carried out, in which the linear waveguide was heated to 500° C. at a rate of temperature rising of 5° C./min, the light guide was maintained for 3 hours in the state, and cooled at a rate of temperature cooling of 5° C./min. At this time, refractive indices of the core film and the clad film were 1.921 and 1.911 respectively. The waveguide thus obtained was cut by a dicing apparatus, and its end faces were polished to be mirror-like finished surfaces. Using waveguides of different lengths, losses of the respective waveguides were measured, and as a result, the loss of the waveguide itself was 5 dB/cm.

Example 5

On a soda lime silica glass circular substrate 11 (1 mm thick, 76.2 mm in diameter), a glass thin film was formed and the film was patterned to form a light guide.

First of all, sputtering was carried out for 66 hours to form an underlayer clad film 12 of 7.2 μm thick, and then, on the underlayer clad film, sputtering was carried out for 20 hours and 15 minutes to form a core film 13 of 3.3 μm thick, sputtering was carried out for 13 hours to form a protection film (a film to be an upper layer clad) of 300 nm thick. These glass films formed on the glass substrate was confirmed to be amorphous by X-ray diffraction measurement. Here, in this Example, the conditions for forming the glass film were the same as those of Example 1 except that the gas flow rate at a time of forming a core film was such that Ar was 30 $cm^3$/min and oxygen was 0.5 $cm^3$/min. Further, film-forming speed to form the glass film by sputtering, changes depending on wearing condition of the target, and thus, the film forming speed was appropriately calibrated at the time of film forming.

Then, a mask film 14 was formed by using a $W_6Si_4$ target, and using a positive resist film, a pattern constituted by 30 pieces of linear core patterns of 5 μm wide and 5.0 to 7.6 cm long arranged in a pitch of 125 μm, were formed, and in the same manner as Example 1, patterning of the mask film 14 was carried out. When the core after the dry etching was observed by SEM, in the linear cores, there was no adhered matter in the vicinity of side walls and surface condition was smooth, and the shape of core pattern not including the mask film 14 was such that the upper side, the lower side and the height (etching depth) were 2.8 μm, 5.4 μm and 4.2 μm respectively, and angles A and B of FIG. 1 were each 73°. Namely, a core having a trapezoidal cross section was formed, in which the upper side, the lower side and the height were 3.0 μm, 5.0 μm and 3.3 μm respectively, and angles A and B of FIG. 1 were each 73°. Subsequently, in the same manner as Example 1, the metal mask was removed by ICP etching, and on the glass subjected to concavo-convex fabrication, sputtering was carried out for 66 hours to form an upper layer clad film of 7.2 μm thick was formed, thermal treatment was carried out, the substrate were cut into respective core patterns, and end faces were polished into mirror-like finished surfaces, to obtain glass optical waveguides of this Example.

The respective indices of the core film and the clad film produced in the above process were 1.942 and 1.913 respectively. Losses of waveguides of different lengths were measured and as a result, loss of the optical waveguide of this Example itself was 0.13 dB/cm.

To wavelength division multiplex (WDM) fiber couplers of fusion extension type were prepared, and the WDM fiber couplers were coupled to the respective ends of the glass optical waveguide of 6 cm long produced in this Example, to constitute a bidirectional exciting optical system. Namely, into exciting light ports of respective WDM fiber couplers coupled to the respective ends of the glass optical waveguide of this Example, exciting light of wavelength 980 nm and a power 140 mW is input from a semiconductor laser diode disposed outside, and into a signal light port of one of the WDM fiber couplers, signal light having a wavelength distance of 2.5 nm, a wavelength range of 1,520 to 1,600 nm and a power of −10 dBm was input, and signal light output from a signal light port of the other WDM fiber coupler, was input into a light spectrum analyzer to measure intensity of signal light. By this construction, it is possible to make the glass optical waveguide of this Example excite bidirectionally to evaluate amplification characteristics.

Figure 4:
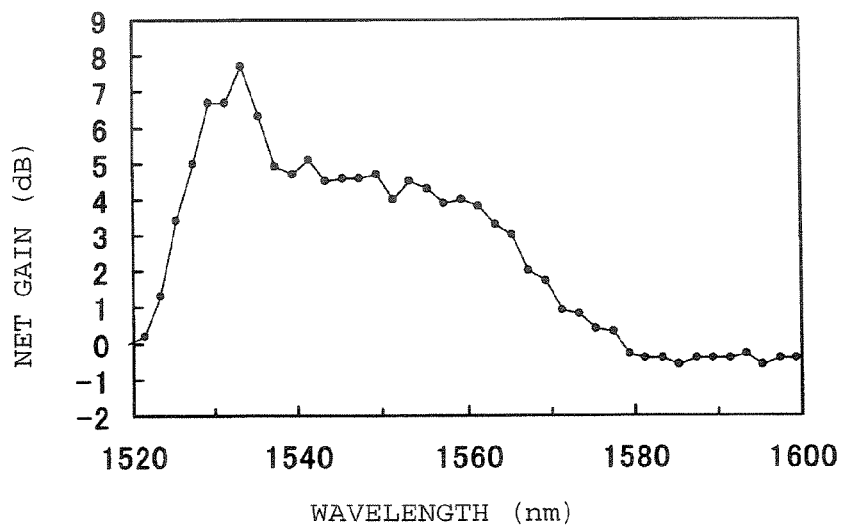
FIG. 4: A graph showing amplification characteristics of an optical amplifying waveguide employing the glass optical waveguide of the present invention.
Figure 5:
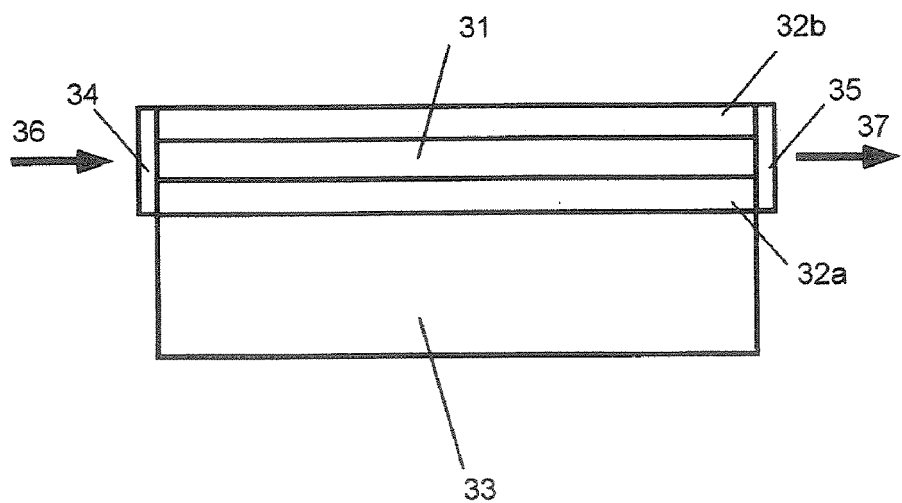
FIG. 5: A schematic cross-sectional view of a laser resonator employing the optical waveguide of the present invention as an optical waveguide type laser medium.

A signal light intensity SA measured at this time, was corrected by a light loss SB of optical system other than the glass optical waveguide of this Example, which was measured in advance by a light spectrum analyzer, whereby a net gain is obtained. The net gain thus obtained was shown in FIG. 4. It is understandable that about 8 dB of gain was obtained at a wavelength 1,530 nm.

Example 6

By a method equivalent to the above-mentioned method, a disk-shaped glass was produced and bonded to a backing plate for sputtering, to produce sputtering targets T3 and T4 having the same compositions as those of T1 and T2 respectively. Here, in this Example, the diameter of glass formed by melting was 152.4 mm, and the glass obtained was ground and polished to have a thickness of 5 mm. Using these targets, in the same method and conditions as those of Example, 1, a glass film was formed on the soda lime silica glass circular substrate 33, and patterned to form a waveguide.

Namely, an underlayer clad film 32a of 6.4 μm thick was formed by using T4 target, a core film 31 of 3.3 μm thick was formed by using T3 target, and a protection film to form an upper layer clad of 300 nm thick was formed by using T4 target, and in the same manner as Example 1, dry etching by a magnetic neutral loop discharge plasma etching apparatus NLD500, and plasma treatment were carried out, $N_2$ gas purging and vacuum destroying were repeated 30 times, and thereafter, dry etching was carried out again to pattern the core glass film, to form a linear core pattern of 2 cm long. Sputtering times to form the underlayer clad film 32a, the core film 31 and the protection film to form the upper layer clad, were 38 hours, 13 hours 30 minutes and 1 hour 45 minutes respectively. In the linear core thus formed, no adhered matter was present in the vicinity of its side walls and the surfaces of the side walls were smooth, and the shape of the core pattern not including the mask film 14 was such that the upper side, the lower side and the height (etching depth) were 2.8 μm, 5.4 μm and 4.2 μm respectively, and the angles A and B of FIG. 1 were each 73°. Namely, a core having a trapezoidal cross section was formed, in which the upper side, the lower side and the height were 3.0 μm, 5.0 μm and 3.3 μm respectively, and the angles A and B of FIG. 1 were each 73°.

Then, the mask film is removed and on the glass subjected to concave-convex fabrication, an upper layer clad film 32b of 6.4 μm thick is formed by sputtering for 38 hours using a T4 target. A linear waveguide formed by foregoing steps, is subjected to heat treatment in a flow of oxygen gas in a vacuum chamber, to obtain a glass optical waveguide.

Here, applied RF power at the time of sputtering the glass film is 280 W, flow rates of argon and oxygen as sputtering gases as converted as standard conditions are 120 cm$^3$/min and 0.7 cm$^3$/min respectively at times of forming the underlayer clad film 12, the protection film to be the upper layer clad, and the upper layer clad film, and they are 200 cm$^3$/min and 0.7 cm$^3$/min respectively at the time of forming the core film 13. Other conditions are same as those of FIG. 1.

Further, in each of the glass films formed by the above process, no diffraction peak was recognized in a X-ray diffraction measurement and thus the glass film is amorphous, and the amount of $Bi_2O_3$ in mass % is 74.1%. Refractive indices of the obtained core film and the clad film are 1.978 and 1.950 respectively, and loss of the waveguide is 0.13 dB/cm.

Using the glass optical waveguide of 2 cm long obtained in the above process as an optical waveguide type laser medium, a Fabry-Perot type resonator is produced.

One end of the obtained glass optical waveguide is used as an exciting light input end, and the other end is used as a laser light output end, and on each of these ends, a dielectric multilayer mirror employing $SiO_2$ as low refractive index layer material and $Ta_2O_5$ as high refractive index layer material, is formed by vapor deposition. At this time, a mirror 34 formed on the exciting light input end has a transmittance of 99.5% for light of wavelength 980 nm used as exciting light, and a reflectivity of 99% for light of wavelength 1,530 nm emitted as laser light, and a mirror 35 formed on a laser light output end has a transmittance of 99.5% for light of wavelength 980 nm and a reflectivity of 60% for light of wavelength 1,530 nm.

Into the exciting light input end of the resonator thus obtained, using a semiconductor laser having a emission wavelength of 980 nm band, exciting light 36 being laser light of power 100 mW is input using a condenser lens. Among emission bands of Er ion excited by the input exciting light, light of wavelength 1,530 nm reflected by the mirrors provided at input and output ends, is amplified in the optical waveguide type laser medium, and output from the laser light output end as laser light 37. When the output light is input into a single mode optical fiber by the condenser lens and guided to a light spectrum analyzer to measure the spectrum, only light of wavelength 1,530 nm having a narrow spectrum band is observed to be output, which confirms that the output light is laser light.

INDUSTRIAL APPLICABILITY

The glass optical waveguide of the present invention is suitable for e.g. optical amplifying waveguide or nonlinear optical waveguide in 0.4 to 2 μm wavelength band.

Further, the glass optical waveguide of the present invention can be suitably employed as a laser medium for emitting laser, and in this case, by appropriately selecting laser activation ion and exciting light wavelength, it is possible to conduct laser emission of 1,060 to 3,000 nm band.

The entire disclosures of Japanese Patent Application No. 2004-208658 filed on Jul. 15, 2004 and Japanese Patent Application No. 2005-62532 filed on Mar. 7, 2005 including specifications, claims, drawings and summaries are incorporated herein by reference in their entireties.

What is claimed is:

1. A glass optical waveguide comprising a core and a clad made of a glass formed on a planar substrate, wherein the glass constituting the core contains at least 35% in mass % of at least one oxide selected from the group consisting of $Bi_2O_3$, $Sb_2O_3$, PbO, $SnO_2$ and $TeO_2$ as glass-constituting oxide, cross sectional shape of the core is a trapezoid having a long side in the substrate side, and among four sides constituting the trapezoid, angles of two oblique sides to the long side are each within a range of from 60 to 80°.

2. The glass optical waveguide according to claim 1, wherein the glass-constituting oxide of the clad is at least one oxide selected from the group consisting of $Bi_2O_3$, $Sb_2O_3$, PbO, $SnO_2$ and $TeO_2$, and a value obtained by dividing the refractive index difference between the core and the clad by the refractive index of the core is within a range of from 0.0003 to 0.1.

3. The glass optical waveguide according to claim 1, wherein the core of the optical waveguide is formed by dry etching.

4. The glass optical waveguide according to claim 1, wherein the glass-constituting oxide of the core is a glass-constituting oxide containing at least 35% of $Bi_2O_3$ in mass %.

5. The glass optical waveguide according to claim 1, wherein the glass-constituting oxide of the core contains at least one oxide of Er and Tm.

6. A glass optical waveguide according to claim 5, wherein the glass-constituting oxide of the core has a composition comprising 35 to 90% of $Bi_2O_3$, 2 to 40% of $SiO_2$, 5 to 25% of $Ga_2O_3$, 0 to 5% of $Al_2O_3$, 0.1 to 10% of at least one of $Er_2O_3$ and $Tm_2O_3$ and 0 to 10% of $Yb_2O_3$.

7. An optical amplifying waveguide for optical communication comprising the glass optical waveguide as defined in claim 5.

8. A glass optical waveguide according to claim 1, wherein the glass-constituting oxide of the core contains at least one oxide selected from the group consisting of oxides of Er, Tm, Yb and Ho.

9. An optical light guide type laser medium comprising the glass optical waveguide as defined in claim 8.

10. A process for producing a glass optical waveguide comprising a core and a clad made of a glass formed on a planar substrate, wherein the glass constituting the core contains at least 35% in mass % of at least one oxide selected from the group consisting of $Bi_2O_3$, $Sb_2O_3$, PbO, $SnO_2$ and $TeO_2$ as glass-constituting oxide, cross sectional shape of the core is a trapezoid having a long side in the substrate side, and among four sides constituting the trapezoid, angles of two oblique sides to the long side are each within a range of from 60 to 80°, said process including forming the core of the optical waveguide by dry etching.

11. The process for producing a glass optical waveguide according to claim 10, wherein the glass-constituting oxide of the clad is at least one oxide selected from the group consisting of $Bi_2O_3$, $Sb_2O_3$, PbO, $SnO_2$ and $TeO_2$, and a value obtained by dividing the refractive index difference between the core and the clad by the refractive index of the core is within a range of from 0.0003 to 0.1.

12. The process for producing a glass optical waveguide according to claim 10, wherein the glass-constituting oxide of the core is a glass-constituting oxide containing at least 35% of $Bi_2O_3$ in mass %.

13. The process for producing a glass optical waveguide according to claim 10, wherein the glass-constituting oxide of the core contains at least one of oxide of Er and Tm.

* * * * *